(12) United States Patent
Christiansson et al.

(10) Patent No.: US 9,710,101 B2
(45) Date of Patent: Jul. 18, 2017

(54) DATA PROCESSING IN RELATION TO A MULTI-TOUCH SENSING APPARATUS

(71) Applicant: FlatFrog Laboratories AB, Lund (SE)

(72) Inventors: Tomas Christiansson, Torna-Hallestad (SE); Ola Wassvik, Brosarp (SE); Christer Fåhraeus, Bjarred (SE)

(73) Assignee: Flatfrog Laboratories AB, Lund (SE)

( * ) Notice: Subject to any disclaimer, the term of this patent is extended or adjusted under 35 U.S.C. 154(b) by 0 days.

(21) Appl. No.: 14/881,739

(22) Filed: Oct. 13, 2015

(65) Prior Publication Data
US 2016/0034099 A1 Feb. 4, 2016

Related U.S. Application Data

(63) Continuation of application No. 13/807,159, filed as application No. PCT/SE2011/050871 on Jun. 29, 2011, now Pat. No. 9,158,401.

(30) Foreign Application Priority Data

Jul. 1, 2010 (SE) ...................................... 1050724

(51) Int. Cl.
*G06F 3/041* (2006.01)
*G06F 3/0488* (2013.01)
*G06F 3/044* (2006.01)

(52) U.S. Cl.
CPC ............ *G06F 3/0416* (2013.01); *G06F 3/041* (2013.01); *G06F 3/044* (2013.01);
(Continued)

(58) Field of Classification Search
CPC .... G06F 3/0416; G06F 3/04883; G06F 3/041; G06F 2203/04808; G06F 2203/04104
(Continued)

(56) References Cited

U.S. PATENT DOCUMENTS 7,151,530 B2 12/2006 Roeber et al.
7,465,914 B2 12/2008 Eliasson et al.
(Continued)

FOREIGN PATENT DOCUMENTS

EP 2077490 A2 7/2009
WO WO-03/041006 A1 5/2003
(Continued)

OTHER PUBLICATIONS

International Search Report PCT/ISA/210.

*Primary Examiner* — Michael Pervan
(74) *Attorney, Agent, or Firm* — Harness, Dickey & Pierce P.L.C.

(57) ABSTRACT

A device obtains a signal representative of objects on a touch surface of a multi-touch sensing apparatus and executes a method for extracting touch data from the signal. The method operates in a sequence of detection frames. Each detection frame comprises the steps of: obtaining (300) the signal; processing (301) the signal for identifying touches; determining (302) a set of identified touches and touch data for the set of identified touches; and outputting (303) the touch data. At least one of the steps of processing (301) and determining (302) includes a prioritization that actively favors certain touches to be identified and included in the set of identified touches, respectively. Temporal prioritization favors a touch that corresponds to a previous touch, which is identified in one or more preceding detection frames. Spatial prioritization favors a touch that is located within at least one predefined subarea on the touch surface. The prioritization enables the touch data to be generated in way that is predictable, consistent and in accordance with user expectations within a general or specific context.

19 Claims, 9 Drawing Sheets

Related U.S. Application Data

(60) Provisional application No. 61/344,337, filed on Jul. 1, 2010.

(52) U.S. Cl.
CPC .................. *G06F 3/04883* (2013.01); *G06F 2203/04104* (2013.01); *G06F 2203/04808* (2013.01)

(58) Field of Classification Search
USPC .................. 178/18.01–19.07; 345/173–178
See application file for complete search history.

(56) References Cited

U.S. PATENT DOCUMENTS

| | | |
|---|---|---|
| 2004/0136564 A1 | 7/2004 | Roeber et al. |
| 2008/0012835 A1 | 1/2008 | Rimon et al. |
| 2008/0284925 A1 | 11/2008 | Han |
| 2009/0174679 A1 | 7/2009 | Westerman |
| 2010/0026667 A1 | 2/2010 | Bernstein |
| 2010/0073318 A1 | 3/2010 | Hu et al. |
| 2010/0141604 A1 | 6/2010 | Cai et al. |
| 2010/0309139 A1* | 12/2010 | Ng .................. G06F 3/0418 345/173 |
| 2011/0074735 A1 | 3/2011 | Wassvik et al. |

FOREIGN PATENT DOCUMENTS

| | | |
|---|---|---|
| WO | WO-2006/095320 A2 | 9/2006 |
| WO | WO-2008/007372 A2 | 1/2008 |
| WO | WO-2009/007704 A1 | 1/2009 |
| WO | WO-2010/006882 A2 | 1/2010 |
| WO | WO-2010/006883 A2 | 1/2010 |
| WO | WO-2010/056177 A1 | 5/2010 |
| WO | WO-2010/064983 A2 | 6/2010 |
| WO | WO-2011/049511 A1 | 4/2011 |
| WO | WO-2011/049513 A1 | 4/2011 |
| WO | WO-2011/139213 A1 | 11/2011 |

* cited by examiner

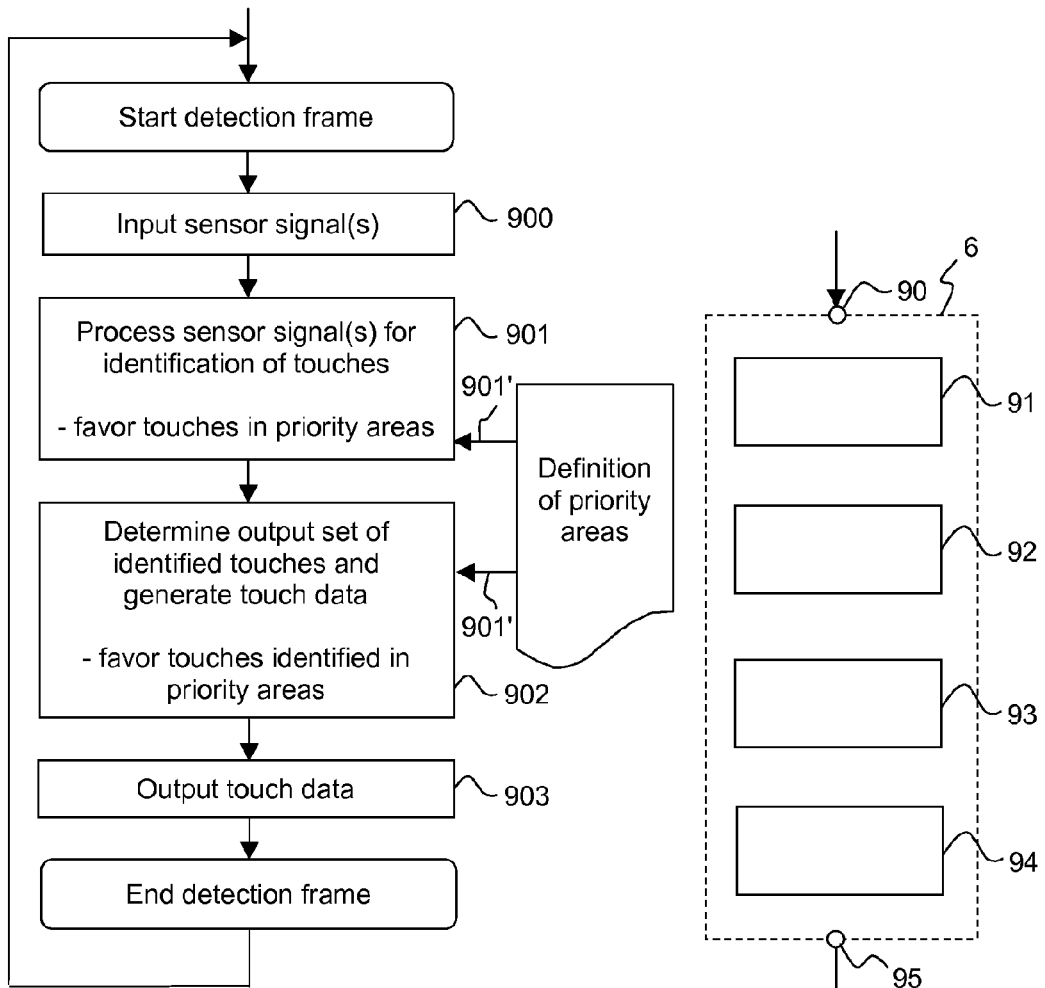
FIG. 9(a)
Fig. 9(b)
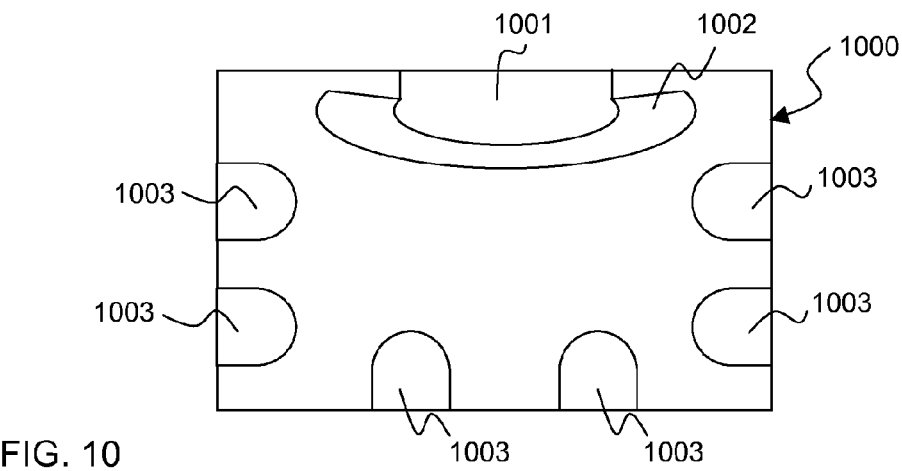
FIG. 10

DATA PROCESSING IN RELATION TO A MULTI-TOUCH SENSING APPARATUS

CROSS-REFERENCE TO RELATED APPLICATIONS

The present application is a Continuation of U.S. application Ser. No. 13/807,159, filed Dec. 27, 2012, which is the National Stage under 35 U.S.C. §371 of International Application No. PCT/SE2011/050871, which has an international filing date of Jun. 29, 2011, and which claims priority to Swedish patent application No. 1050724-2, filed Jul. 1, 2010, and U.S. provisional application No. 61/344,337, filed Jul. 1, 2010, both of which are incorporated herein by reference.

TECHNICAL FIELD

The present invention relates to techniques for data processing in relation to a multi-touch sensitive apparatus, i.e. an apparatus which is capable of detecting plural simultaneous touches on a touch surface.

BACKGROUND ART

Touch sensing panels are in widespread use in a variety of applications. Typically, the touch sensing panels are actuated by a touch object such as a finger or stylus, either in direct contact, or through proximity (i.e. without contact). Sometimes a stylus is used instead. Touch sensing panels are for example used as touch pads of laptop computers, in control panels, and as overlays to displays on e.g. hand held devices, such as mobile telephones. A touch panel that is overlaid on or integrated in a display is also denoted a "touch screen". Many other applications are known in the art.

As used herein, all different types of touch sensitive apparatuses, including touch sensing panels, touch pads, touch screens, etc, are collectively referred to as "touch systems".

To an increasing extent, touch systems are designed to be able to detect two or more touches simultaneously, this capability often being referred to as "multi-touch" in the art.

There are numerous known techniques for providing multi-touch sensitivity. In US2010/141604 resistive wire grids are incorporated into a panel to form a tactile sensor, and in WO2009/007704 an array of capacitive sensors is used for the same purpose. WO03/041006 discloses a multi-point touch pad formed by strain gauges incorporated into a panel. There are also multi-touch systems that are based on optical detection, and many of these systems may be scaled to large sizes without adding significant cost. For example, U.S. Pat. No. 7,465,914 discloses a panel which is internally illuminated by light that propagates by total internal reflection (TIR), where the light that is scattered by a touch object is detected by means of one of more angle-sensitive light detectors arranged at the periphery of the panel. US2008/0284925 discloses the use of a similarly illuminated panel, where the touch objects are detected by imaging the light that escapes from the panel at the location of the touch objects. WO2010/006882 and WO2010/064983 disclose multi-touch systems that operate by propagating light through a panel by TIR, and by identifying the locations of touch objects based on the attenuation caused by the touches in the transmitted light. WO2006/095320 discloses a touch system in which light is propagated above the touch surface, whereby the touch objects locally block the propagating light. WO2010/056177 discloses a multi-touch system including a light guide placed over a display integrated with light sensors, whereby the light sensors are operated to locally detect light that is scattered from the light guide by objects touching the light guide. Other proposed techniques for multi-touch sensitivity uses ultrasound or surface acoustic waves, see e.g. US2010/0026667.

As the availability of multi-touch systems increases, and in particularly as these systems are made available in a wide range of sizes and enabling an increased number of simultaneous touches, it can be foreseen that software applications with advanced user interaction will be developed to be run on devices with these types of touch systems. For example, a user may be allowed to enter advanced multi-touch gestures or control commands, in which fingers on one or both hands are dragged across a touch surface, and it may be possible for several users to work concurrently on the touch surface, either in different application windows, or in a collaborative application window.

Irrespective of sensor technology, the touches need to be detected against a background of measurement noise and other interferences, e.g. originating from ambient light, fingerprints and other types of smear on the touch surface, vibrations, etc. The influence of measurement noise and interferences may vary not only over time but also within the touch surface, making it difficult to properly detect the touches on the touch surface at all times.

The combination of several touches, complex gestures as well as temporal and spatial variations in background and noise will make the identification of touches a more demanding task. The user experience will be greatly hampered if e.g., an ongoing gesture on a touch screen is interrupted by the system failing to detect certain touches during the gesture.

The task of providing a uniform and consistent user experience may be even more demanding if the touch system has a limitation on the maximum number of simultaneous touches that may be detected with accuracy. Such a system may not be able to detect weaker touches when there are touches generating stronger measurement signals. One difficult situation may arise when more than one person operates on the touch surface. For example, in a touch system configured to detect three touches, if a second person puts down three fingers on the touch surface while a first person makes a drag with one finger, it is not unlikely that the system will ignore the remainder of the drag since a drag typically generates weaker signal levels from the touch sensors than non-moving touches.

As another example of a difficult situation, consider a touch system used for a casino application, which enables a number of players and a croupier to interact with the touch surface. If there is a limitation of the maximum number of touches, the touch system may not be able to correctly and consistently detect the interaction from the croupier unless the players are instructed to lift their hands from the touch surface.

The prior art also comprises US2010/0073318 which discloses a technique for detecting and tracking multiple touch points on a touch surface using capacitance readings from two independent arrays of orthogonal linear capacitive sensors. A touch point classifier in combination with a Hidden Markov Model (HMM) is operated on the capacitance readings to determine the number (N) of touch points on the touch surface. Then, a peak detector processes the capacitance readings to identify the N largest local maxima, which are processed by a Kalman tracker to output the location of N touch points. The Kalman tracker matches touch points determined in a current time frame with predicted locations of touch points determined in preceding time frames. For each predicted touch point, the nearest touch point in the current time frame is found in terms of Euclidian distance. If the distance exceeds a threshold, the predicted touch point is output, otherwise the nearest touch point is output.

SUMMARY

It is an object of the invention to at least partly overcome one or more limitations of the prior art.

In view of the foregoing, one object is to enable a uniform and consistent user experience when interacting with a multi-touch system.

One or more of these objects, and further objects that may appear from the description below, are at least partly achieved by means of methods for extracting data, computer program products, devices for generating touch data, and multi-touch sensing apparatuses according to the independent claims, embodiments thereof being defined by the dependent claims.

A first aspect of the invention is a method for extracting data from a multi-touch sensing apparatus. The method operates in a sequence of detection frames, each detection frame comprising the steps of: obtaining at least one signal representative of objects on a touch surface of the sensing apparatus; processing said at least one signal for identifying touches; determining a set of identified touches and touch data for the set of the identified touches; and outputting the touch data; wherein each detection frame includes a prioritization based on a previous touch which is identified by the step of processing in one or more preceding detection frames, wherein the prioritization is included in at least one of the step of processing and the step of determining, wherein the prioritization in the step of processing comprises a step of actively favoring that a touch corresponding to the previous touch is identified, and wherein the prioritization in the step of determining comprises a step of actively favoring that an identified touch corresponding to the previous touch is included in the set of identified touches.

By including the prioritization in at least one of the step of processing and the step of determining, thereby actively favoring a touch for inclusion in the set of identified touches, and thus in the touch data to be output, it is possible to control the data extraction so as to achieve a desired user experience, specifically that the multi-touch sensing apparatus operates in way that is predictable, consistent and in accordance with the expectations of the user or users within a general or specific context. By designing the prioritization so that the favored touch corresponds to a previous touch among the touches identified in one or more preceding detection frames, ongoing gestures/drags on the touch screen may be prioritized over new touches, which decreases the likelihood that touches are inadvertently lost in gestures/drags. It is to be understood that more than one touch may be actively favored in this manner. When the prioritization is included in the step of processing, the step of actively favoring certain touches is done during the touch identification, e.g. by selectively optimizing the touch identification to promote identification of certain touches. When the prioritization is included in the step of processing, the step of actively favoring certain touches is done after the touch identification, e.g. by actively selecting an identified touch to be included in the set of identified touches.

Accordingly, in one embodiment, the step of actively favoring in the step of processing operates to promote that the touch is identified in said at least one signal.

In one embodiment, the step of processing comprises a step of identifying a signal feature in said at least one signal, wherein the step of actively favoring in the step of processing comprises estimating the location of the touch that corresponds to the previous touch and identifying the signal feature based on the thus-estimated location. The signal feature may be a local change in signal values in a projection signal, in which the signal values corresponds to transmitted energy on a plurality of detection lines across the touch surface. Alternatively, the signal feature may correspond to a local change in signal values in a distribution of an energy-related parameter within at least part of the touch surface. The distribution may be generated based on one or more projection signals, or it may be obtained from an imaging system of the sensing apparatus.

In one embodiment, the step of processing comprises a step of comparing a spatial distribution of signal values to corresponding threshold values, wherein the step of actively favoring in the step of processing comprises estimating the location of the touch that corresponds to the previous touch and locally changing the threshold values based on the thus-estimated location. The signal values may be included in said at least one signal, e.g. the above-mentioned projection signal(s). Still further, the signal values may be included in a distribution of an energy-related parameter within at least part of the touch surface, said distribution being obtained based on said at least one signal. The distribution may be generated based on one or more projection signals, or it may be obtained from an imaging system of the sensing apparatus.

In one embodiment, the step of processing comprises: obtaining, based on said at least one signal, a distribution of an energy-related parameter within at least part of the touch surface; identifying a set of local extrema (e.g. maxima or minima) in the distribution, and sequentially processing the set of local extrema for determining the touch data, wherein the step of actively favoring in the step of processing comprises actively favoring one or more local extrema in the set of local extrema.

In one embodiment, the step of processing comprises: identifying a number of touches based on said at least one signal, wherein the step of actively favoring in the step of determining comprises actively selecting the set of identified touches as a subset of said number of identified touches. The set of identified touches set may be limited to a predefined maximum number of touches. Further, the step of processing may comprise determining age data for each touch, the age data representing the number of preceding detection frames in which the touch is deemed to be identified, and the set of identified touches may be selected among the number of touches based on the age data.

In one embodiment, the prioritization comprises: sequentially applying different prioritization criteria to actively determine the set of identified touches.

In one embodiment, the prioritization limits the set of identified touches to touches corresponding to previous touches.

In one embodiment, the prioritization further comprises: accessing a history list which contains location data and age data of touch traces, wherein each touch trace represents a previous touch, the location data representing the most recent location(s) of the previous touch on the touch surface, and the age data representing the number of detection frames in which the previous touch has been identified, and wherein the step of actively favoring in the step of processing is based on at least the location data in the history list. The step of actively favoring in the step of processing may be further based on the age data in the history list. Additionally or alternatively, the step of actively favoring in the step of determining may be based on the age data in the history list. The method may further comprise the steps of matching said set of identified touches for a current detection frame to the touch traces in the history list, and updating the history list based on the step of matching. The step of updating may comprise, for each touch trace that matches a touch in said set of identified touches, changing the location data to represent a current location of the touch. Alternatively or additionally, the step of updating may comprise, for each touch trace that fails to match a touch in the set of identified touches, removing the touch trace from the history list. The removal of the touch trace may be effected a given number of detection frames following the current detection frame, unless the touch trace is found to match a touch identified in one of said number of detection frames following the current detection frame. Alternatively or additionally, the step of updating may comprise, for each touch in the set of identified touches that fails to match a touch trace in the history list, adding a new touch trace to the history list based on the touch.

In one embodiment, said at least one signal is obtained from a plurality of sensors arranged within and/or around the touch surface.

A second aspect of the invention is a computer program product comprising computer code which, when executed on a data-processing system, is adapted to carry out the method of the first aspect.

A third aspect of the invention is a device for generating touch data in a sequence of detection frames. The device comprises: an element for obtaining, in each detection frame, at least one signal representative of objects on a touch surface of a multi-touch sensing apparatus; an element for processing, in each detection frame, said at least one signal for identifying touches; an element for determining a set of identified touches and touch data for the set of identified touches; an element for outputting, in each detection frame, said touch data. The device is configured to effect a prioritization based on a previous touch which is identified by the element for processing in one or more preceding detection frames, wherein the prioritization is implemented by at least one of the element for processing and the element for determining, wherein the element for processing is configured to effect the prioritization by actively favoring that a touch corresponding to the previous touch is identified, and wherein the element for determining is configured to effect the prioritization by actively favoring that an identified touch corresponding to the previous touch is included in the set of identified touches.

A fourth aspect of the invention is a device for generating touch data. The device comprises: an input; and a signal processor connected to said input and configured to operate in a sequence of detection frames, each detection frame comprising the steps of obtaining via said input at least one signal representative of objects on a touch surface of a multi-touch sensing apparatus; processing said at least one signal for identifying touches; determining a set of identified touches and touch data for the set of identified touches; and outputting said touch data. Each detection frame includes a prioritization based on a previous touch which is identified by the step of processing in one or more preceding detection frames, wherein the prioritization is included in at least one of the step of processing and the step of determining, wherein the prioritization in the step of processing comprises a step of actively favoring that a touch corresponding to the previous touch is identified, and wherein the prioritization in the step of determining comprises a step of actively favoring that an identified touch corresponding to the previous touch is included in the set of identified touches.

The third and fourth aspects share the advantages and technical effects of the first aspect. It is also to be understood that the devices for generating touch data may involve elements/means or a signal processor for identifying, obtaining, determining, processing or otherwise providing any of the features defined in the above-mentioned embodiments of the first aspect.

A fifth aspect of the invention is a multi-touch sensing apparatus, comprising: a touch surface, a plurality of sensors arranged within and/or around the touch surface and adapted to generate at least one signal representative of objects on the touch surface, and the device of the third or fourth aspects.

A sixth aspect of the invention is a method for extracting data from a multi-touch sensing apparatus. The method comprising the steps of: obtaining at least one signal representative of objects on a touch surface of the sensing apparatus; processing said at least one signal for identifying touches; determining a set of identified touches and touch data for the set of identified touches; and outputting the touch data; wherein each detection frame includes a prioritization based on at least one predefined subarea on the touch surface, wherein said at least one predefined subarea has a fixed location on touch surface or is defined in relation to one or more graphical objects that are interactively displayed on the touch surface, wherein the prioritization is included in at least one of the step of processing and the step of determining, wherein the prioritization in the step of processing comprises a step of actively favoring that a touch is identified within said at least one predefined subarea, and wherein the prioritization in the step of determining comprises a step of actively favoring that an identified touch is included in the set of identified touches if the identified touch is located within said at least one predefined subarea.

By including the prioritization in at least one of the step of processing and the step of determining, thereby actively favoring one or more touches that are located within at least one predefined subarea on the touch surface, it may be ensured that the data extraction achieves a desired user experience, specifically that the multi-touch sensing apparatus operates in way that is predictable, consistent and in accordance with the expectations of the user or users within a general or specific context. For example, it may be ensured that the touch identification (the step of processing) identifies touches in the predefined subarea(s), such that these touches are included in the touch data to be output, even if these touches are weaker, smaller or otherwise more difficult to detect than other touches on the touch surface.

In one embodiment, the method further comprises applying a maximum limit to the number of touches within said at least one predefined subarea to be included in the set of identified touches.

In one embodiment, a plurality of predefined subareas are defined on the touch surface, each subarea having a priority value, wherein the step of actively favoring in the step of processing comprises identifying touches within the subareas according to an ordering given by the priority value of each subarea, and wherein the step of actively favoring in the step of determining comprises selecting, based on the respective priority values of the subareas, the touches to be included in the set of identified touches among the touches that are located within the predefined subareas.

In one embodiment, the prioritization limits the set of identified touches to touches in said at least one predefined subarea.

A seventh aspect of the invention is a computer program product comprising computer code which, when executed on a data-processing system, is adapted to carry out the method of the sixth aspect.

An eight aspect of the invention is a device for generating touch data. The device comprises: an element for obtaining at least one signal representative of objects on a touch surface of a multi-touch sensing apparatus; an element for processing said at least one signal for identifying touches; an element for determining a set of identified touches and touch data for the set of identified touches; and an element for outputting the touch data; wherein the device is configured to effect a prioritization based on at least one predefined subarea on the touch surface, wherein said at least one predefined subarea has a fixed location on touch surface or is defined in relation to one or more graphical objects that are interactively displayed on the touch surface, wherein the prioritization is implemented by at least one of the element for processing and the element for determining, wherein the element for processing is configured to effect the prioritization by actively favoring that a touch is identified within said at least one predefined subarea, and wherein the element for determining is configured to effect the prioritization by actively favoring that an identified touch is included in the set of identified touches if the identified touch is located within said at least one predefined subarea.

A ninth aspect of the invention is a device for generating touch data, said device comprising: an input; and a signal processor connected to said input and configured to obtain via said input at least one signal representative of objects on a touch surface of a multi-touch sensing apparatus; process said at least one signal for identifying touches; determine a set of identified touches and touch data for the set of identified touches; and output said touch data; wherein the signal processor is further configured to include a prioritization in at least one of the step of processing and the step of determining, the prioritization being based on at least one predefined subarea which has a fixed location on touch surface or is defined in relation to one or more graphical objects that are interactively displayed on the touch surface, wherein the prioritization in the step of processing comprises a step of actively favoring that a touch is identified within said at least one predefined subarea, wherein the prioritization in the step of determining comprises a step of actively favoring that an identified touch is included in the set of identified touches if the identified touch is located within said at least one predefined subarea.

The eighth and ninth aspects share the advantages and technical effects of the sixth aspect. It is also to be understood that the devices for generating touch data may involve elements/means or a signal processor for identifying, obtaining, processing, determining or otherwise providing any of the features defined in the above-mentioned embodiments of the sixth aspect.

A tenth aspect of the invention is a multi-touch sensing apparatus, comprising: a touch surface, a plurality of sensors arranged within and/or around the touch surface and adapted to generate at least one signal representative of objects on the touch surface, and the device of the eighth or ninth aspects.

Still other objectives, features, aspects and advantages of the present invention will appear from the following detailed description, from the attached claims as well as from the drawings.

BRIEF DESCRIPTION OF THE DRAWINGS

Embodiments of the invention will now be described herein by way of example only, with reference to the accompanying schematic drawings.

FIG. 9(a) is a flow chart of a method for extracting touch data from a touch system using spatial prioritization, and FIG. 9(b) is a device for implementing the method in FIG. 9(a).

FIG. 10 is a top plan view of a gaming table with spatial priority areas.

DETAILED DESCRIPTION OF EXAMPLE EMBODIMENTS

Figure 1A:
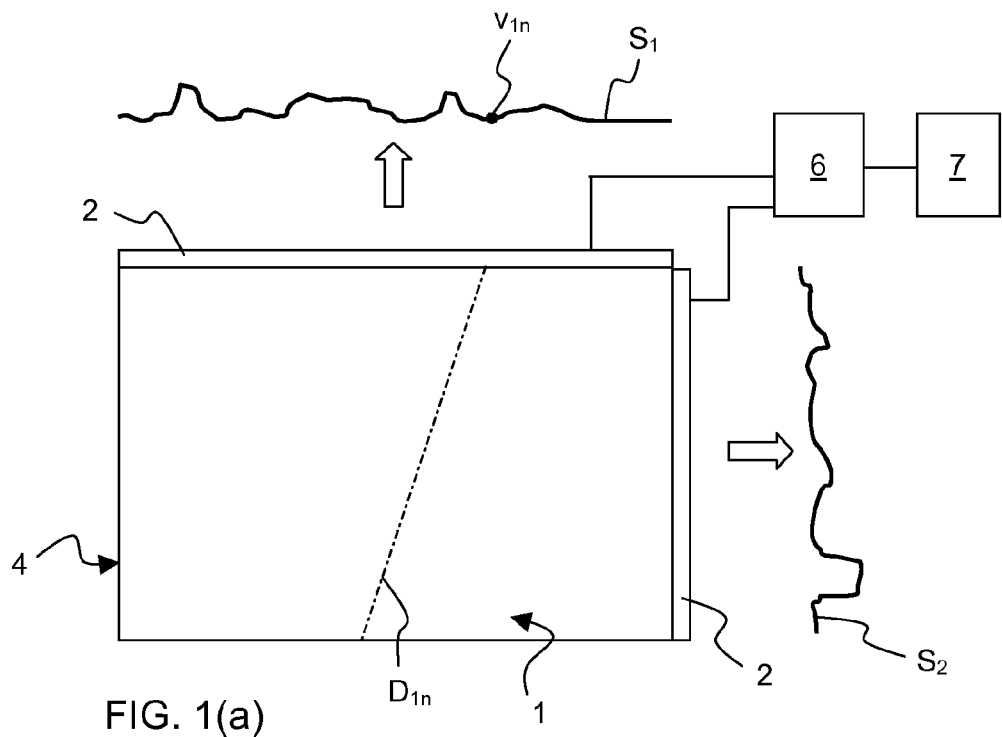
FIGS. 1(a)-1(b) are top plan views of a projection system and an imaging system, respectively.

The present invention relates to techniques for generating touch data for touches on a touch surface of a multi-touch sensing apparatus. Throughout the description, the same reference numerals are used to identify corresponding elements.

Embodiments of the invention will be described with reference to two main categories of touch systems. One category is denoted "projection system", which is exemplified in FIG. 1(a). A projection system measures the interaction on a touch surface 1 along detection lines across the touch surface 1. The resulting projection data for all detection lines are then processed to reconstruct an image of the interaction on the touch surface 1.

Figure 1B:
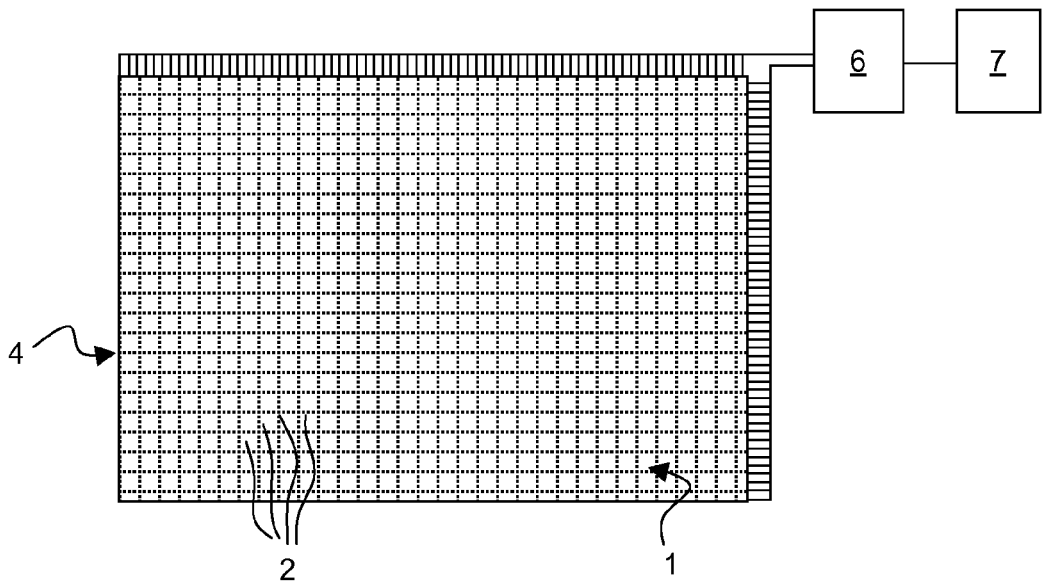

In the example of FIG. 1(a), which is a top plan view of a projection system with sensors 2 arranged at the periphery of a panel 4 that defines the touch surface 1. As indicated, the output of the sensors 2 is collected to form "projection signals" $S_1$, $S_2$, in which each signal value represents the interaction along a detection line. In FIG. 1, one detection line $D_{1n}$ is illustrated together with the resulting signal value $v_{1n}$. The sensors 2 may be arranged to receive energy signals that have propagated across the touch surface 1. The energy signals may propagate in the panel 4 or slightly above the panel 4. The touch panel 4 may be configured to permit transmission of energy in one of many different forms. The transmitted energy signals may thus be any radiation or wave energy with an ability to travel across the touch surface 1 including, without limitation, light waves in the visible or infrared or ultraviolet spectral regions, electrical energy, electromagnetic or magnetic energy, or sonic and ultrasonic energy or vibration energy. Alternatively (not shown), the sensors may be arranged in rows and columns within the touch surface and connected to sampling circuitry, which is operated to integrate the sensor signals from the sensors in each row and/or column. Thereby, projection signals are generated by the sampling circuitry when reading the sensor signals from the sensors in the array.

Examples of projection systems are given in WO2010/006882, WO2010/064983 and WO2006/095320, which were discussed in the Background section.

Another category of touch systems is denoted "imaging system", which is exemplified in FIG. 1(*b*). An imaging system includes one or more sensors 2 that capture an image of the interaction on the touch surface 1. As shown in the top plan view of FIG. 1(*b*), the sensors 2 may be integrated into the panel 4 that defines the touch surface 1 to locally sense a parameter that represents the interaction. For example, the sensors 2 may be configured to detect light, capacitive or resistive changes, application pressure, etc. Alternatively, light sensitive sensors may be arranged above, behind or at the periphery of the panel to capture images of the touch surface 1.

Examples of imaging systems are found in US2010/141604, WO2009/007704, WO03/041006 US2008/0284925, WO2010/056177 and US2010/0026667, all discussed in the Background section.

In both examples in FIGS. 1(*a*)-1(*b*) the outputs of the sensors 2 are electrically connected to a decoding unit 6 which implements a process of data capture and data processing that results in touch data. The decoding unit 6 is electrically connected to an application unit 7, which may operate on the touch data to interact with the user within the context of a software application, e.g. by displaying information to the user via a display (not shown) which may be integrated with or placed underneath the panel 4. The decoding unit 6 and the application unit 7 may be implemented on separate devices or in a common device.

Before describing embodiments of the invention, a few definitions will be given.

As used herein, a "touch object" is a physical object that touches, or is brought in sufficient proximity to the touch surface 1 so as to be detected by one or more of the sensors 2 in the touch system. The physical object may be animate or inanimate. An "interaction" occurs when the touch object affects a sensor 2 or a parameter measured by the sensor 2. An "interaction strength" is a relative or absolute measure of the degree of interaction.

As used herein, a "touch" denotes a point of interaction as seen in the interaction map. A touch may be associated with different touch parameters, such as a location on the touch surface 1 in any coordinate system, an interaction strength, a size (e.g. diameter, area, etc), a shape, etc. A "true touch" denotes a point of interaction that originates from a touch object, whereas a "ghost touch" denotes a point of interaction that does not originate from a touch object but may be mistaken for a true touch.

As used herein, a "trace" is information about the temporal history of an interaction. Touches from an interaction detected in a sequence of frames, i.e. at different points in time, are collected into a trace.

A trace may be associated with different trace parameters, such as an age, a location, a size and a location history. The "age" of a trace indicates how long the trace has existed, and may be given as a number of frames, the frame number of the earliest touch in the trace, a time period, etc. The "location" of the trace is given by the location of the most recent touch in the trace, and the "size" of a trace denotes the size of the most recent touch in the trace. The "location history" denotes at least part of the spatial extension of the trace across the touch surface 1, e.g. given as the locations of the latest few touches in the trace, or the locations of all touches in the trace, a curve approximating the shape of the trace, or a Kalman filter.

Figure 2:
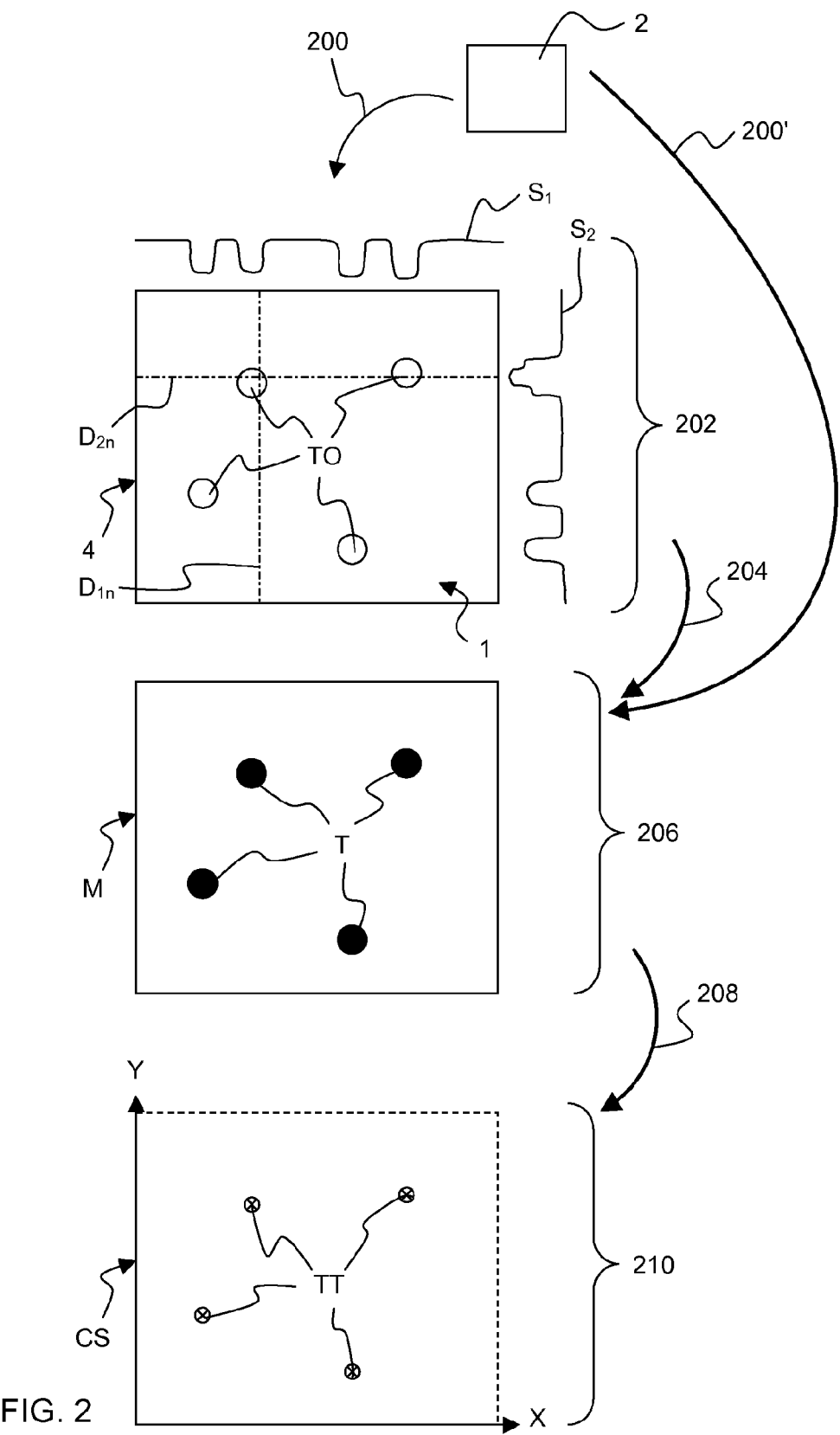
FIG. 2 illustrates data capture and data processing in a projection system.

FIG. 2 gives an overview of different steps in the processing of signals from a projection system.

In step 200, sensor readings are obtained from one or more of the sensors in the projection system in the form of one or more projection signals (cf. $S_1$, $S_2$ in FIG. 1). In the illustrated example, the projection system operates with detection lines $D_{1n}$, $D_{2n}$ that extend horizontally (only one shown) and vertically (only one shown) across the touch surface 1, resulting in two projection signals $S_1$, $S_2$. It is should be realized that for multi-touch detection, the projection system typically operates with detection lines that extend in more than two, and typically much more than two, different directions across the touch surface 1. The interaction between a touch object TO and a detection line $D_{1n}$, $D_{2n}$ results in a decrease in the corresponding signal value in the projection signal $S_1$, $S_2$. In the illustrated example, there are four touch objects TO on the touch surface 1.

In step 202, the projection signals $S_1$, $S_2$ may be processed for extraction of signal features and/or for signal enhancement, e.g. reduction of measurement noise. This step may involve a matching of signal values in the projection signals $S_1$, $S_2$ to one or more threshold values. More advanced techniques may of course be implemented, for example feature detection, evaluating neighboring signal values, etc. For all types of touch systems, the extraction/enhancement processing is suitably tuned to avoid or suppress ghost touches arising from noise in the sensor readings or inherent artifacts of the touch system.

In step 204, the one-dimensional projection signals $S_1$, $S_2$ (or the extracted signal features) are processed to reconstruct a two-dimensional interaction map M, in which a signal-related parameter is mapped onto the touch surface 1 (or part thereof) based on the projection signals $S_1$, $S_2$. The interaction map M is thus an (often simplified) image of the distribution of touches T on the touch surface 1. The reconstruction may involve a simple geometric triangulation, or more advanced methods such as a tomographic reconstruction or a Bayesian inversion. Examples of such methods may be found in Applicant's patent applications WO2010/006883, WO2011/049511, PCT/SE2011/050520 filed on 28 Apr. 2011, and U.S. 61/391,764 filed on 11 Oct. 2010, all of which are incorporated herein by reference. In projection systems that operate by measuring transmitted energy or power, the interaction map M may be a distribution of an energy-related parameter, such as transmission or attenuation.

Depending on the touch system, there will be different degrees of measurement noise and artifacts in the interaction map M. The artifacts may be generated by the reconstruction process or be inherent to the touch system. In a projection system, there may, e.g., be shadowed regions arising from overlapping shadows from true touches (see example further below). In imaging systems, ghost touches may, e.g., be formed close to true touches.

In step 206, the interaction map M may be processed for signal enhancement, e.g. reduction of measurement noise or artifacts generated by the reconstruction process or inherent to the touch system. The processing for artifact reduction is typically unique and tailored to each type of touch system.

In step 208, the interaction map M is processed to identify true touches TT and extract touch data for these touches. Such touch data may include the coordinates of each touch within the coordinate system CS of the touch surface 1. Other types of touch data include area and/or shape of each touch TT. Since the area is a function of applied pressure, at least for flexible objects (e.g. fingertips), the contact pressure between the object T and the touch surface 1 may also be estimated for each touch TT.

The identification of touches may, similarly to step 202, involve a step of matching the parameter values in the interaction map to one or more threshold values. More advanced techniques may of course be implemented, for example clustering algorithms, evaluating neighboring signal values, edge detection algorithms, etc. For all types of touch systems, the identification of touches is suitably tuned to avoid or suppress identification of ghost touches or artifacts. Step 208 may also involve a separate touch filtering process, in which all identified touches are processed with the aim of removing ghost touches while retaining true touches. Alternatively, such touch filtering is an integrated part of the procedure for identifying touches.

It is realized that steps 206 and 208 need not be executed in sequence, but may be merged into a single step in which the signal enhancement and the touch identification are done by one and the same process or are otherwise inseparable.

In step 210, the touch data is output, e.g. for receipt by a software application program operating on the application unit (7 in FIG. 1) to interact with the user via the touch surface 1.

After step 210, the process returns to step 200 to obtain a new set of sensor readings. Each sequence of steps 200-210 is denoted a "detection frame" or "frame", which thus is a period of time in which data is collected from all relevant sensors 2 and touch data is computed for this data.

It should be realized the process in FIG. 2 is equally applicable to data capture and data processing in imaging systems, if steps 202 and 204 are omitted. In imaging systems, the sensor readings directly form a two-dimensional interaction map M (i.e. an image) of the touch surface 1 (or part thereof), as indicated by step 200' in FIG. 2.

Embodiment 1: Temporal Prioritization

FIG. 3(*a*) is a flow chart of a method of extracting data from a multi-touch system according to an embodiment of the present invention. As shown, the method operates in a repeating sequence of detection frames, where each detection frame involves steps 300-303. In step 300, one or more sensor signals is obtained (e.g. sampled) from the sensor(s) in the touch system. The sensor signal(s) represents touch objects on the touch surface of the touch system. In step 301, the sensor signal(s) are processed for identification of touches. As will be further exemplified below, the processing in step 301 may be designed to actively favor certain touches to be identified, namely touches that are deemed to correspond to a touch identified in one or more preceding frames. This essentially means that touches with history (i.e. traces) are favored over new touches. This type of prioritization of touches is also called "temporal prioritization" in the following description. In step 301, "search areas" are identified on the touch surface based on touch predictions (e.g. predicted location and size) which are determined based on a step 301' of accessing a data structure denoted "trace history list" that stores data (values of trace parameters) for the traces deemed relevant to the current frame (cf. step 401, described below). The data structure may be implemented as any collection of records, and need not be a list. As indicated in FIG. 3(*a*), step 301 also involves a step 301" of updating the records in the trace history list based on the touches that are identified in the current frame, i.e. to make sure that the trace history list stores data on the traces deemed relevant to the forthcoming frame. Examples below will show that the step of actively favoring certain touches may be done, e.g., by selectively changing a threshold level so as to promote identification of touches in certain parts (the search areas) of the touch surface, which parts have been determined based on the trace history list. It is also conceivable to promote identification of certain touches by processing the search areas in order of decreasing age, e.g. by first processing the search area corresponding to the trace with the largest value of the age parameter in the trace history list.

In step 302, a set of identified touches is determined for the current frame. This set of identified touches is also denoted "output set" herein and contains the touches that will be processed for generation of the touch data to be output for the current frame. Depending on implementation, the output set may include all touches identified in step 301 or a subset of these touches. As will be exemplified in further detail below, if the output set consists of a subset of the total number of identified touches in step 301, step 302 may include a step of actively favoring certain touches to be included in the output set, i.e. by making an active selection among the identified touches. In one example, step 302 may involve a temporal prioritization, which actively favors certain touches based on age, e.g. by selecting touches to be included in the output set in order of decreasing age. Step 302 also involves determining touch data for the identified touches in the output set. Similarly to step 301, the step of actively favoring in step 302 may operate on data retrieved from the trace history list by step 301', e.g. the age parameter, and step 302 may also include step 301" of updating the trace history list.

In step 303, the touch data is output.

By comparing FIGS. 2 and 3(*a*), it should be realized that step 300 corresponds to step 200 in projection systems and to step 200' in imaging systems. Further, step 301 may correspond to steps 202-208 in projection systems and to steps 206-208 in imaging systems. Step 302 may correspond to step 208 in projection systems as well as imaging systems.

The touch data extraction process of FIG. 3(*a*) is typically executed by a data processing device (cf. decoding unit 6 in FIG. 1) which is connected to acquire the output signal of the sensors 2 in the touch system. FIG. 3(*b*) shows an example of such a data processing device 6 for executing the process in FIG. 3(*a*). In the illustrated example, the device 6 includes an input 30 for receiving the sensor signal. The device 6 further includes a data acquisition element (or means) 31 for obtaining the sensor signal via the input 30, a touch identification element (or means) 32 for processing the sensor signal to identify touches, a determination element (or means) 33 for determining the output set and generating the touch data for the output set, and an element 34 for outputting the touch data via an output 35.

Figures 3A, 3B:
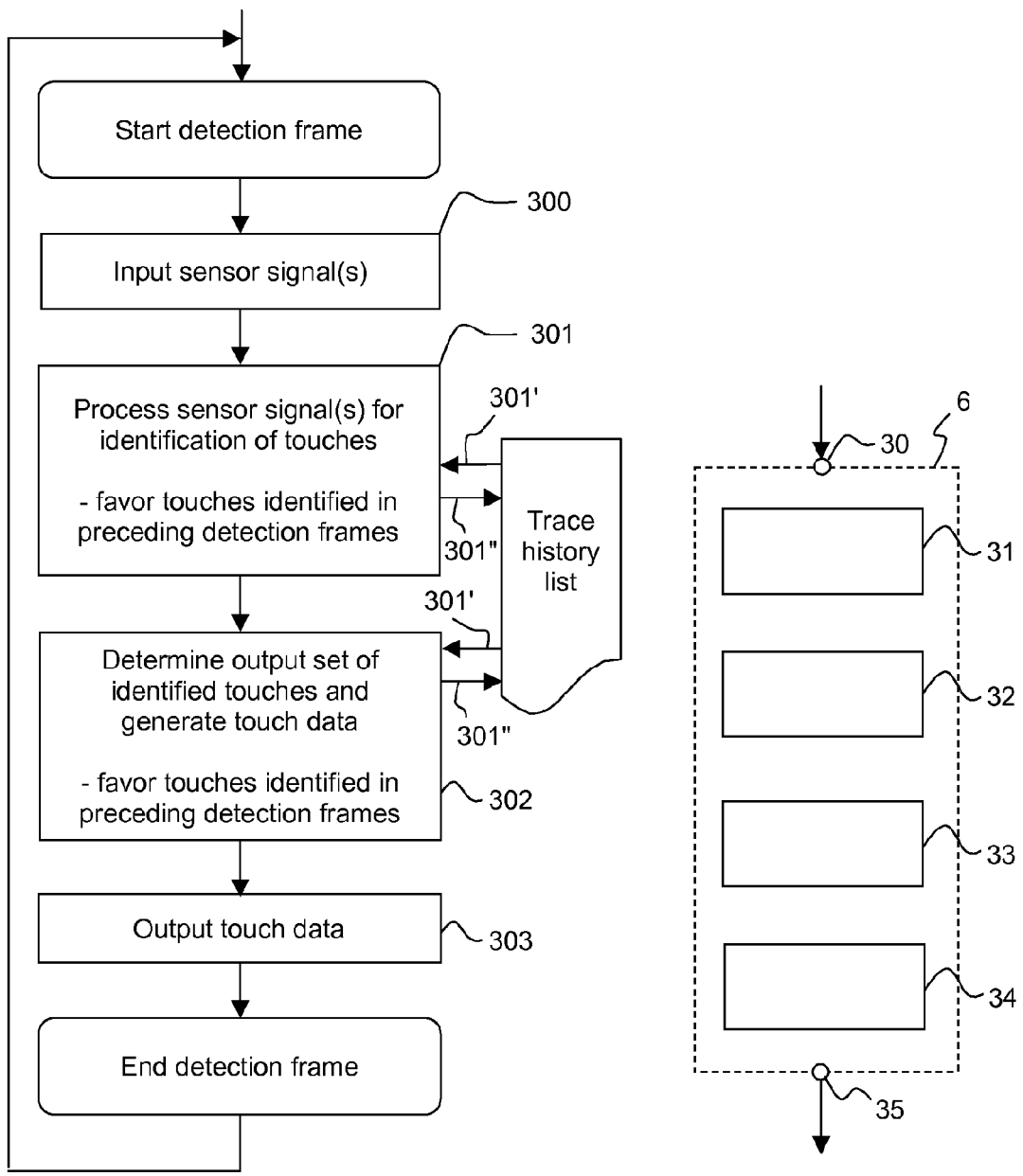
FIG. 3(a) is a flow chart of a method for extracting touch data from a touch system using temporal prioritization.
FIG. 3(b) is a device for implementing the method in FIG. 3(a).
Figure 4:
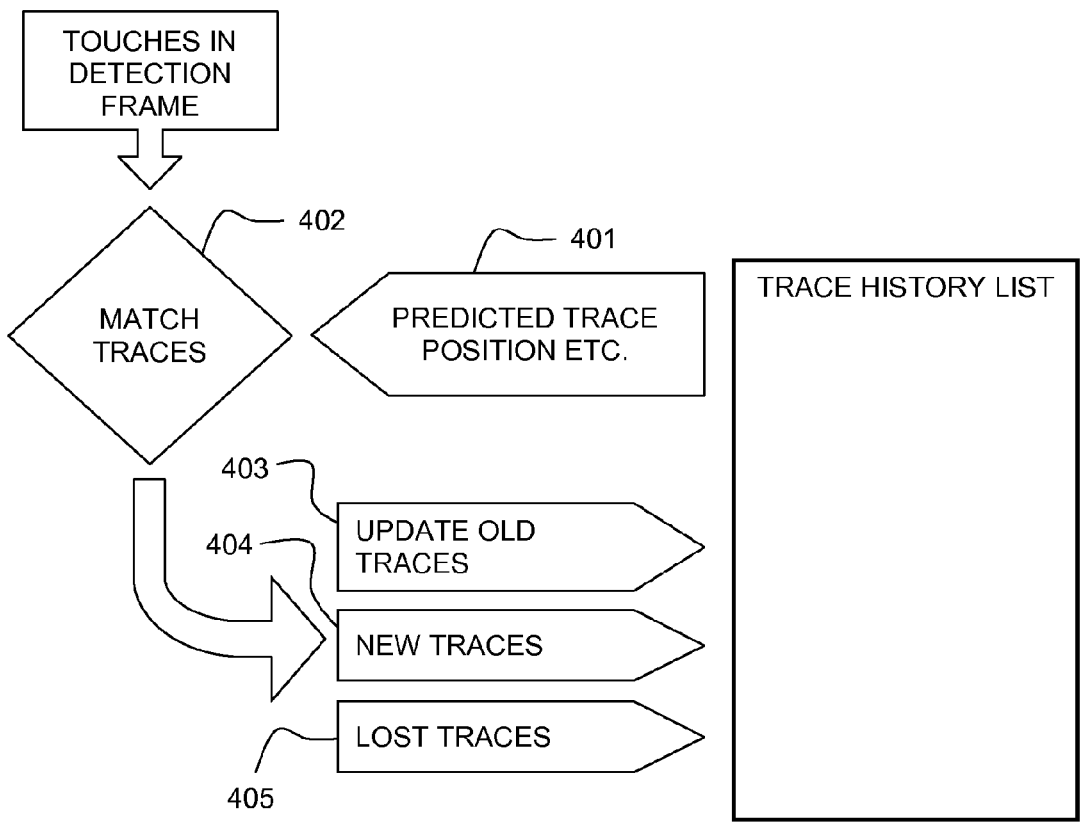
FIG. 4 illustrates a process of maintaining a trace history list which is used in the method of FIG. 3(a).

FIG. 4 illustrates an exemplifying embodiment of a process for maintaining the trace history list. This process is performed in parallel to the steps 300-303 in FIG. 3, and may be implemented in element 31 or 32 as part of step 301 or step 302 (as indicated by step 301"). The aim of the maintaining process is to accurately match the touches that are identified in the current frame to the traces in the trace history list, and to update the trace history list with current trace parameter values. The maintaining process may be described by the steps 401-405 as shown in FIG. 4.

As described above, the trace history list contains values of trace parameters for each trace. In step 401, the trace parameter values for the traces in the trace history list are processed for generating predicted values for the current frame. Depending on trace parameters, step 401 may operate to predict the most likely location (coordinates), size and shape for all traces in the trace history list. Step 401 may be omitted, but is currently believed to improve the quality of the distance measures when computing match values (see step 402).

In step 402, a match value is computed between every touch identified in the current frame (i.e. resulting from step 301 in FIG. 3(*a*)) and every trace in the trace history list. The match value indicates the likelihood of a match between the touch and a specific trace. The match value may, e.g., be computed as a function of the Euclidian distance between the touch and the location of the trace, and/or as a function of a similarity in size and/or shape. Also, invalid match values may be set for touch-trace combinations that are deemed impossible. One limitation for touch-trace combinations may be given by a maximum distance between the touch and the location of the trace, e.g. if the distance is greater than 15 mm, a match is deemed impossible. Imposing restrictions on allowed touch-trace combinations also makes it possible to use smarter algorithms for the match value computations, for example a hierarchical search over the touch surface.

It is to be understood that the match values may be computed to factor in further trace parameters included in the trace history list, e.g. the age of the trace. The inclusion of an age parameter in the computation of the match values may result in further temporal prioritization.

In step 402, the identified touches are also assigned (i.e. matched) into the trace history list based on the match values. The simplest way to do this assignment, if the match values are calculated to represent a better match by a higher match value, is to start with the highest match value and proceed to gradually lower match values (a so-called greedy approach), and vice versa if a better match is represented by a lower match value. There are many other and more elaborate algorithms for making this assignment, such as Hungarian method (Kuhn's algorithm) or any other algorithm solving bipartite matching based on match values. In an alternative, the assignment accounts for the age of the trace associated with the respective match value, e.g. by starting with the oldest match value/trace (largest value of age parameter) and proceeding to gradually younger match values/traces. Accounting for age in the assignment may result in further temporal prioritization.

In step 403, the trace history list is updated for all traces that are assigned to the identified touches, by updating the trace parameters in the list with values for the identified touches, e.g. the current location, shape, size, etc.

In step 404, touches not assigned to traces are interpreted as new traces and are added to the trace history list together with the trace parameter values.

In step 405, traces that are not assigned to any identified touch are interpreted as lost traces and are removed from the trace history list. In one variant, the removal of such a trace is delayed for a few (1-10) frames to make it possible to find touches belonging to the trace in a later frame. This may e.g. avoid removal of weak traces that may be temporarily hidden in noise or artifacts.

Below follows a few non-limiting examples of how the temporal prioritization in steps 301-302 (FIG. 3(*a*)) may be implemented in the context of the process in FIG. 2. The temporal prioritization may be implemented in each of the steps 202-208, and implementation examples will thus be given for each of these steps separately.

1. Temporal Prioritization in Projection Signals (Step 202)

In this example, the temporal prioritization is applied to the process of extracting signal features from the projection signals $S_1$, $S_2$ for use in the subsequent reconstruction of the interaction map M (step 204). The feature extraction may be designed to identify those peaks in the projection signal $S_1$, $S_2$ that may originate from a touch object TO. The peaks may be identified by any suitable technique, although the following example will be directed to the use of thresholding/binarization, in which the signal values in the projections signals $S_1$, $S_2$ are mapped to a threshold.

It may be noted that the interaction map M may be reconstructed based on the extracted signal features, using any available technique. Reference is made to the techniques referenced in relation to FIG. 2, as well the reconstruction technique disclosed in WO2011/049513, which is incorporated herein by this reference. In WO2011/049513, the interaction map M is reconstructed within one or more subareas of the touch surface 1. The subareas are identified by analyzing intersections of detection lines across the touch surface 1, e.g. based on signal features such as peaks identified in the projection signals $S_1$, $S_2$.

The temporal prioritization uses the trace history list to estimate the location and size of a previous trace in the current frame, i.e. to obtain a "current touch estimation". Recalling that each signal value in the projection signal $S_1$, $S_2$ corresponds to a detection line with a known extension across the touch surface 1, each current touch estimation (e.g. location and size) may be mapped to portions of the projection signals $S_1$, $S_2$. Collectively, these portions thus correspond to a "search area" around the current touch estimation. The temporal prioritization operates to selectively apply a lower threshold level in these portions, so as to promote identification of touches in the search area(s).

This example of temporal prioritization reduces the probability of getting interruptions in a trace due to low signal-to-noise ratio (SNR) in the sensor signals.

Figure 5A:
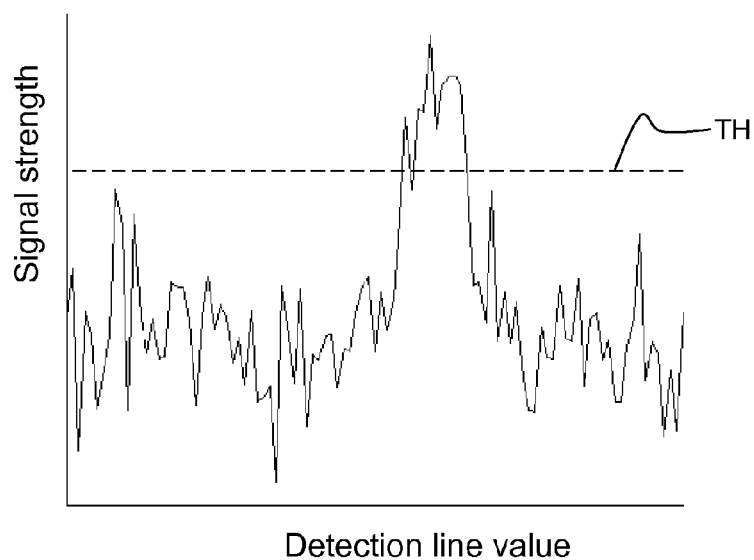
FIG. 5(a) is a graph of a projection signal in relation to a uniform threshold.
Figure 5B:
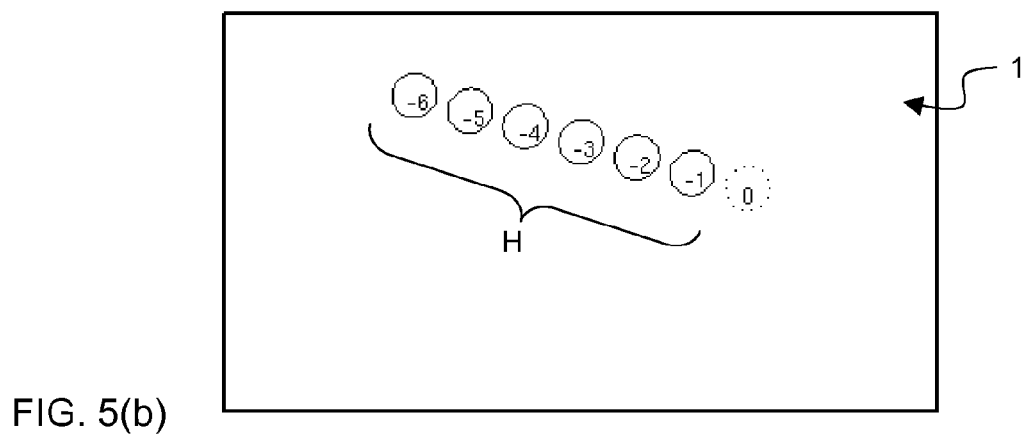
FIG. 5(b) illustrates a sequence of touches forming a trace, and FIG. 5(c) a graph of a projection signal in relation to a locally changed threshold.
Figure 5C:
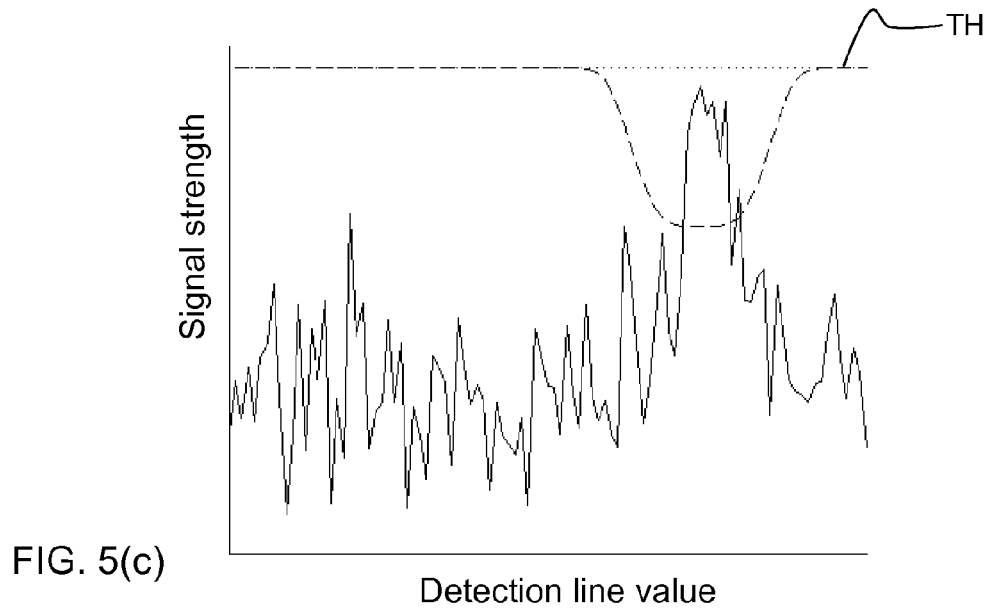

The temporal prioritization will now be further explained with reference to FIGS. 5(*a*)-5(*c*). A projection signal with a low SNR is illustrated in FIG. 5(*a*), together with a peak detection threshold TH, as used in conventional peak detection. Despite the low SNR, a peak may seen in the projection signal, although the peak extends just slightly above the peak detection threshold TH. It is realized that the peak detection is likely to fail from time to time with such a peak detection threshold TH. The peak corresponds to a touch, and the trace history H of this touch is illustrated in FIG. 5(*b*). The full circles represent the location and size of the touch for the last 6 frames. The dashed circle represent the estimated location and size of the touch in the current frame. FIG. 5(*c*) illustrates the projection signal in FIG. 5(*a*) together with a peak detection threshold TH that is selectively reduced in a region around the peak, where the region corresponds to the current touch estimation.

It should be noted that the current touch estimation may be obtained by predicting the location and size of the touch based on the location history of the trace. Alternatively, the current touch estimation may be given by location and size of the trace, i.e. the location and size of the most recent touch in the trace. Further variants are, of course, possible.

2. Temporal Prioritization in Reconstruction (Step 204)

The reconstruction is specific to each type of projection system. With the ambition of keeping the present disclosure reasonably short, no specific examples are given on how to implement the temporal prioritization in the reconstruction. However, the skilled person should be able to readily re-design different known reconstruction algorithms to implement the principles of temporal prioritization based on the present disclosure. For example, the temporal prioritization may be implemented to define a search area around the above-mentioned "current touch estimation" and selectively operate the reconstruction algorithm to generate the interaction map M within each such search area.

3. Temporal Prioritization in Interaction Map Processing (Step 206/208)

In this example, the temporal prioritization is applied to correctly identify touches in the interaction map M, during either the signal enhancement (step 206) or the touch identification (208). As noted above, these steps 206, 208 may be merged into a single processing step, and will be treated as such in the following example, which is applicable for both projection systems and imaging systems.

The interaction map may be processed for identification of touches using any available blob detection technique. Below, two fairly straight-forward examples are given on how to incorporate the temporal prioritization into the interaction map processing.

In a first example, a threshold is applied on the interaction map to find touches. The threshold may originally be set at a (high) level so as to minimize the risk of identifying ghost touches. However, the temporal prioritization operates to selectively lower the threshold in the parts ("search areas") of the interaction map where it is expected to find a touch that belongs to a trace. Thus, like in the example of FIG. 5(b), estimated location and size of the touch in the current frame is determined based on the touch history list.

Figure 6A:
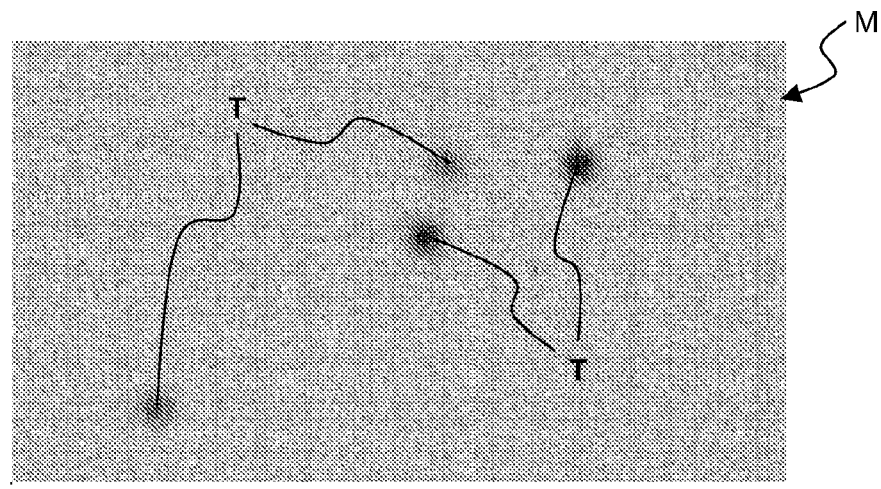
FIGS. 6(a)-6(b) are interaction maps that illustrate the use of search areas for identifying touches.
Figure 6B:
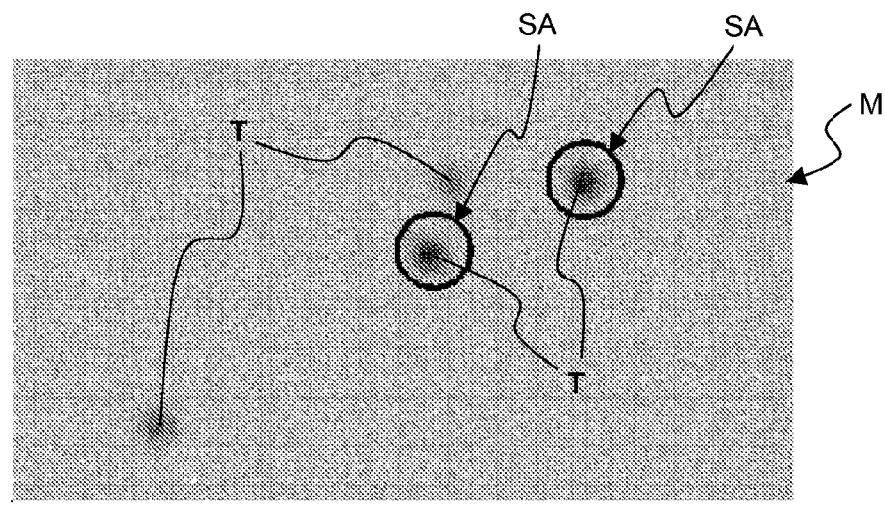

FIG. 6(a) illustrates an interaction map M where there appears to be a number of touches T. From the data in the trace history list, certain search areas SA are identified in the interaction map M, as marked by circles in FIG. 6(b). According to the first example above, the threshold may be locally reduced in these search areas to increase the likelihood of finding a touch. Alternatively or additionally, the search areas SA may be prioritized in the sense that these search areas SA are processed for touch identification before other areas in the interaction map M. For example, if the touch system is designed to only identify a limited number of touches, this temporal prioritization ensures that the identified touches belong to traces, thereby reducing the probability of getting interruptions in traces.

In a second example, the touch identification employs a sort of flood-fill clustering technique. First, local maxima are found in the interaction map. Then, clusters are created in the interaction map by selecting one of the local maxima and flooding to all areas that have lower parameter values (and so far are unclustered). The next cluster is then formed by selecting another local maximum and flooding, etc. To avoid small unclustered areas in the interaction map (e.g. caused by noise that makes the parameter values rise on small areas), the flooding may be designed to pass low "hills" (i.e. regions with slightly increased parameter values) in the falling direction from the selected local maximum. The end result of this clustering process is dependent on the ordering of the local maxima. Thus, the temporal prioritization may be implemented to start with local maxima found in or near the search areas.

4. Temporal Prioritization in Touch Filtering (Step 208)

As indicated above, further filtering techniques ("touch filtering") may be applied on the identified touches to remove ghost touches and artifacts while retaining true touches. For instance, in many touch systems, artifacts may emerge in the interaction map near the location of a true touch. One example is projection systems that operate by propagating radiation above the touch surface, where the touch objects block the propagating radiation. Also in projection systems operating by TIR, weak artifacts may appear close to the touches. In either case, the artifact may be regarded as a form of "shadowed region" downstream of the touch, as seen in the propagation direction of the radiation (i.e. along the respective detection line). In many touch systems, weak ghost touches are prone to appear close to strong true touches.

To determine if a touch is an artifact/ghost touch or a true touch, a property of the touch in the interaction map may be compared to other touches in the interaction map. This process may involve comparing the parameter values of the interaction map to a threshold, which may be selected to enable discrimination between artifacts/ghost touches and true touches.

One implementation of the temporal prioritization is to let touches that are deemed to correspond to a trace in the trace history list be unaffected by the touch filtering, optionally provided that the trace has at least a certain age, e.g. 2-10 frames.

Below, further examples are given of touch filtering techniques and implementations of temporal prioritization in these.

Figure 7A:
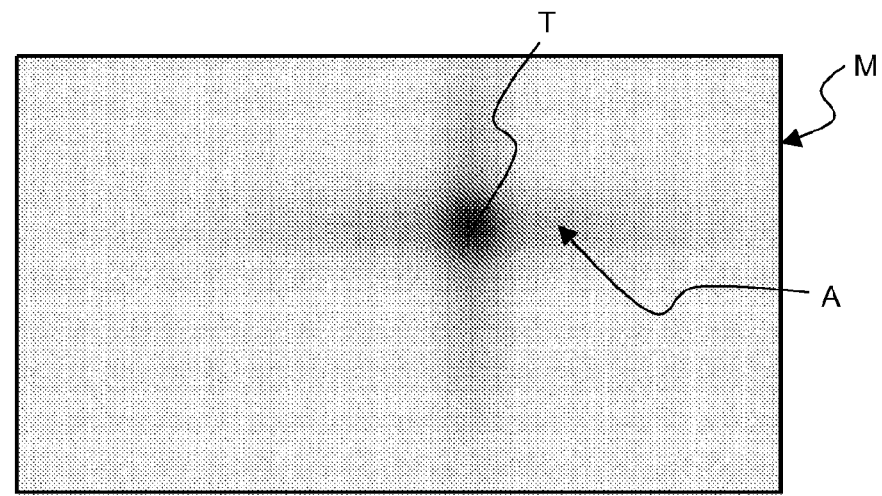
FIGS. 7(a)-7(d) are interaction and thresholds maps that illustrate the use of sensitizing areas for detecting touches in artifacts.
Figure 7B:
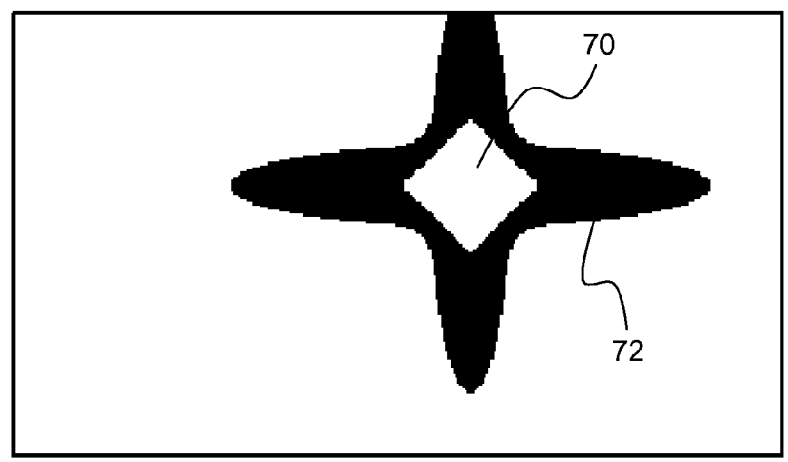
Figure 7C:
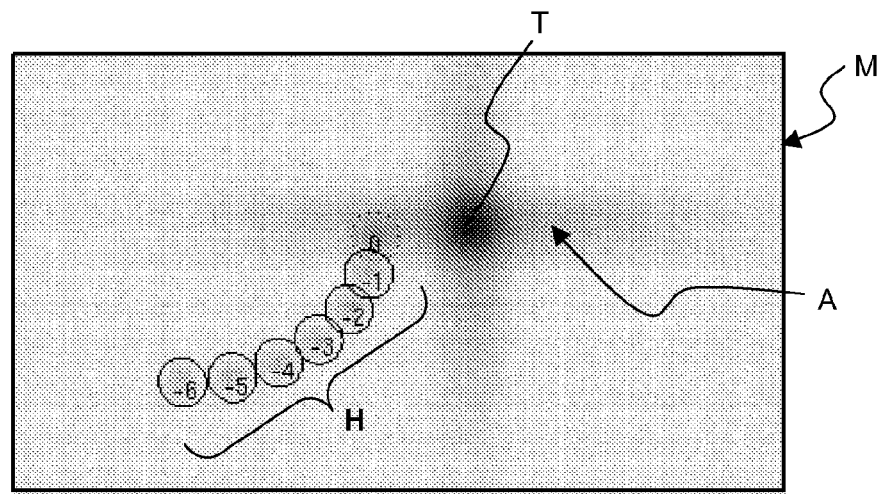
Figure 7D:
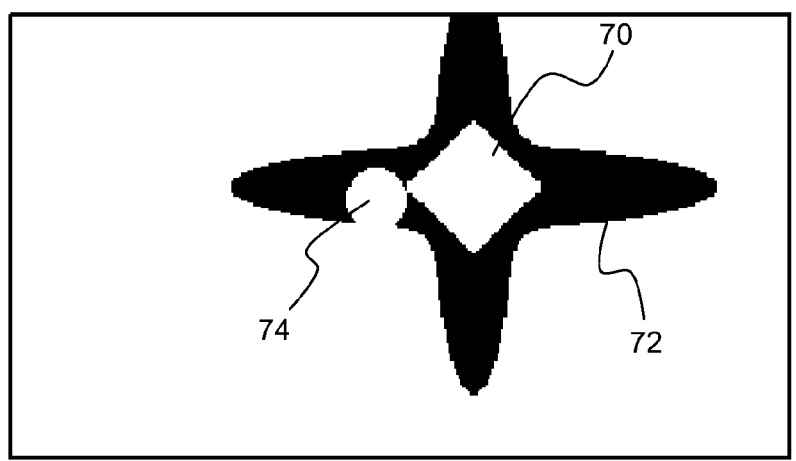

A first example is given with reference to FIGS. 7(a)-7(d). In the first example, the touch system is known to generate an artifact A with increased parameter values that extends in the horizontal and vertical directions away from a strong touch T, as shown in the interaction map of FIG. 7(a). To avoid detecting the artifact A as a true touch, the threshold level may be locally raised around such a strong touch T. The threshold level is thereby raised above the original (default) threshold level that is used for detecting the true touches. In FIG. 7(b), the bright square 70 denotes the strong touch T, and the dark area 72 denotes the surrounding region in which the threshold is raised (also called a "de-sensitized area"). In FIG. 7(c), a trace history H formed by a time sequence of weak touches is overlaid on the interaction map M of FIG. 7(a). As indicated by the dotted circle, an current touch estimation may be determined based on the trace history H. As shown, the current touch estimation falls within the artifact A. To avoid that the current touch falls below the locally raised threshold level in the de-sensitized area 72, and thus that the trace is inadvertently interrupted, the temporal prioritization may be implemented to locally lower the threshold level (to a level above, below or coincident with the original threshold level) in "sensitized areas" around the current touch estimation, as indicated by the bright circle 74 in FIG. 7(d).

Figure 8A:
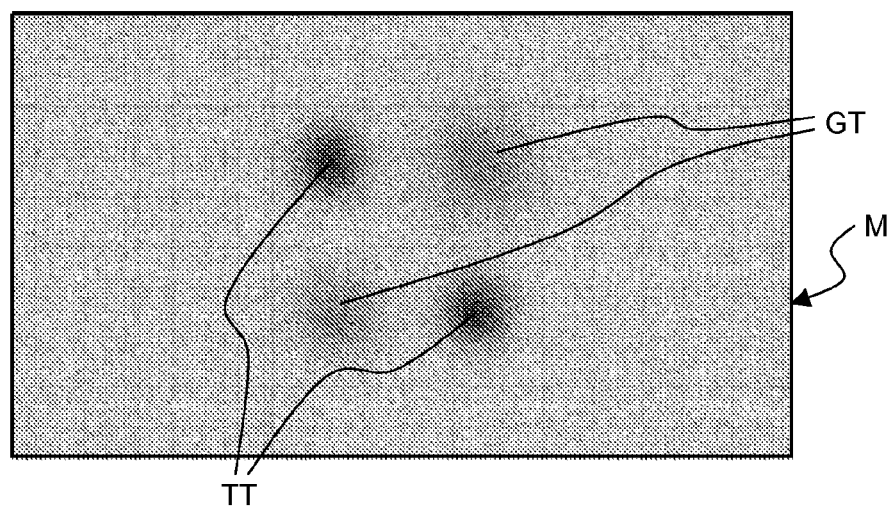
FIGS. 8(a)-8(d) are interaction and thresholds maps that illustrate the use of sensitizing areas for detecting touches in ghost touches.
Figure 8B:
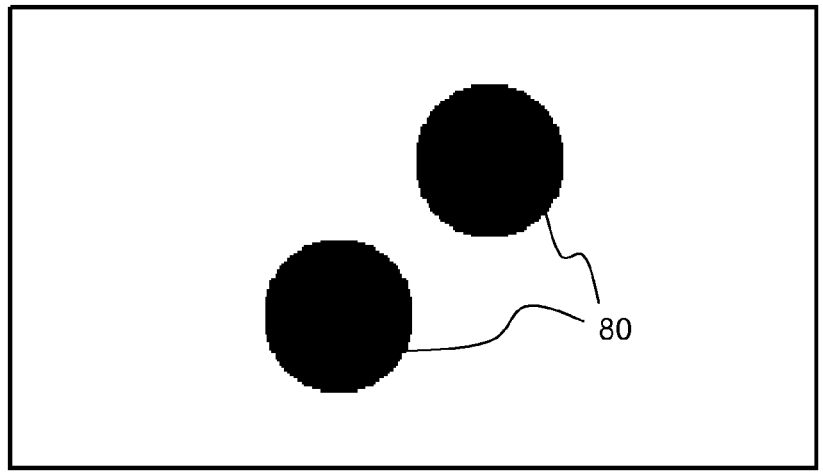
Figure 8C:
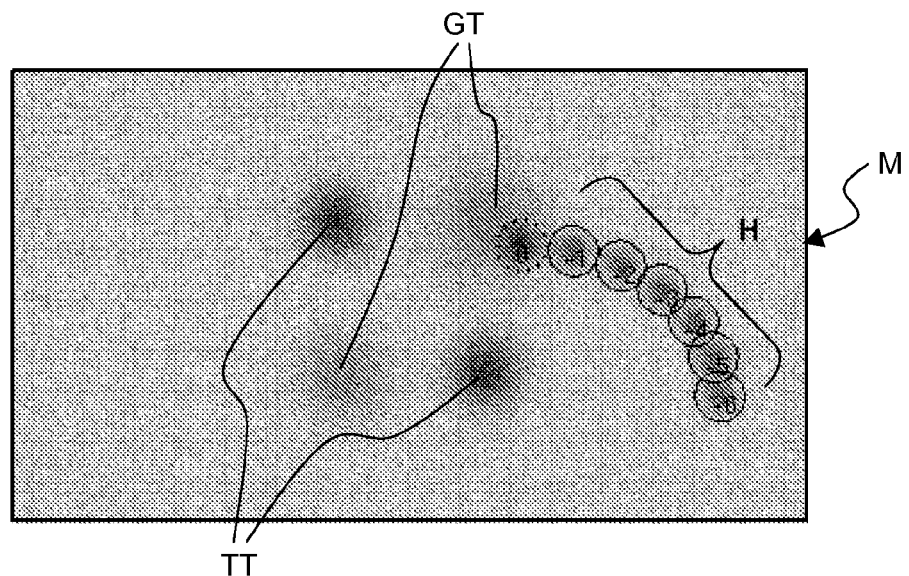
Figure 8D:
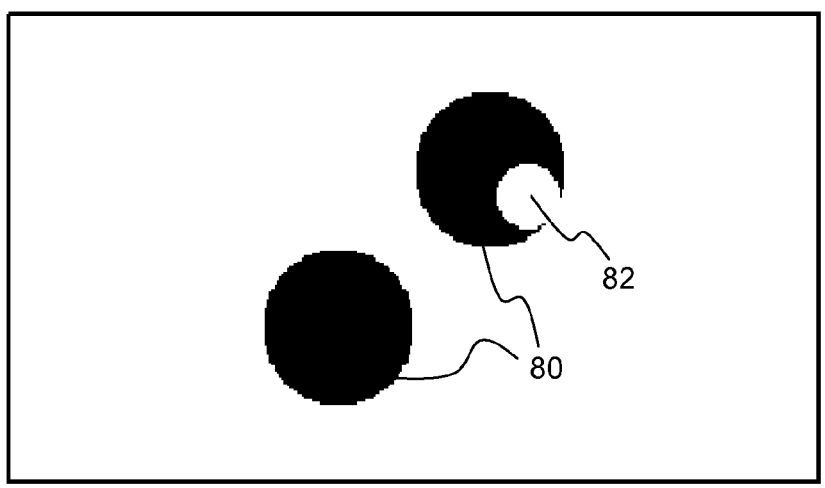

A second example is given with reference to FIGS. 8(a)-8(d). In the second example, the touch system is known to generate ghost touches when two or more touch objects are located sufficiently close to each other on the touch surface. It is assumed that the locations of the ghost touches are known from the relative locations of the true touches. FIG. 8(a) shows an interaction map M with two strong true touches TT and two weak ghost touches GT. To avoid detecting the ghost touches as true touches, the threshold level may be locally raised in de-sensitized areas around the ghost touches. The threshold level is thereby raised above the original (default) threshold level that is used for detecting the true touches. In FIG. 8(b), the dark circles 80 indicate the locally raised threshold level. In FIG. 8(c), a trace history H formed by a time sequence of weak true touches is overlaid on the interaction map in FIG. 8(a). As indicated by the dotted circle, an current touch estimation may be determined based on the trace history H. As shown, the current touch estimation falls within one of the ghost touches GT. To avoid that the current touch falls below the locally raised threshold level in the de-sensitized areas 80, and thus that the trace is inadvertently interrupted, the temporal prioritization may be implemented to locally lower the threshold level (to a level above, below or coincident with the original threshold level) in a sensitized area around the current touch estimation, as indicated by the bright circle 82 in FIG. 8(d).

It should be noted, that the actual shape of the sensitized 74, 82 and de-sensitized areas 72, 80 may be of any shape, such as polygonal, circular, or elliptical. For instance, the sensitized areas may be square/rectangles around the predicted positions since this may yield faster computation.

It should also be noted that the threshold in the sensitized 74, 82 and de-sensitized areas 72, 80 need not be the same over the whole area or between different areas.

5. Temporal Prioritization after Touch Identification (Step 208)

The temporal prioritization may also be applied when the touches have been identified and matched to corresponding traces in the trace history list (cf. steps 402-406). Specifically, it may be decided to only output touch data for touches that are matched to traces of at least a certain age. In other words, the process does not output any new touches and traces that only extend over a limited number of detection frames ("young traces"), but rather waits a few frames until more touches are matched to the new touches/young traces before letting the trace appear in the output. This filtering technique may be used to effectively reduce the number of ghost touches appearing due to, for instance, noise in the interaction map.

In some touch systems, there is a predefined maximum limit to the number of touches in the touch data to be output. The maximum limit may be set by inherent limitations of the touch system or the reconstruction, such that the limit represents the maximum number of touches that may be determined with sufficient accuracy. Alternatively, the maximum number is given by a design selection, e.g. to meet performance criteria such as computational speed or processing intensity in the decoding unit, or to match the number of touches to a requirement set by the application unit (7 in FIG. 1) that receives the touch data.

When operating with a limited number of output touches, there may be an elevated risk that existing traces are interrupted by the appearance of a new touch. This risk may be contained by implementing the temporal prioritization to output the touches based on the age of their associated traces, starting with the oldest trace, until the maximum number of touches have been output. Any remaining traces may be kept in the trace history list, or they may be deleted.

It should be understood that temporal prioritization may be applied in more than one of the steps 202-208 of the process for touch data extraction. For example, two or more of the above examples may be applied in combination to further improve the performance of the process. Likewise, any of the described implementations and examples may serve to significantly improve the user experience in touch systems that operate with a limited number of output touches.

Embodiment 2: Spatial Prioritization

Other types of prioritization of touches may be applied, as a supplement or alternative to the temporal prioritization. Below, a "spatial prioritization" will be described with reference to FIGS. 9-10. This prioritization means that touches in certain predefined areas ("priority areas") on the touch surface 1 are favored over other touches.

FIG. 9(a) is a flow chart of a method of extracting data with spatial prioritization. Steps 900 and 903 are the same as steps 300 and 303, and the description will not be repeated.

In step 901, the sensor signal(s) are processed for identification of touches. As noted above, the processing in step 901 may be designed to actively favor certain touches to be identified, namely touches that are deemed to fall within one or more priority areas on the touch surface 1. The location of the priority areas is determined based on a step 901' of accessing a data structure denoted "priority area definition" that stores data on the location of the priority areas and optionally a priority value for each priority area. The data structure may be implemented as any collection of records.

In step 902, a set of identified touches (an "output set") is determined for the current frame. Depending on implementation, the output set may include all touches identified in step 901 or a subset of these touches. As will be exemplified in further detail below, if the output set consists of a subset of the total number of identified touches in step 901, step 902 may include a step of actively favoring certain touches to be included in the output set, i.e. by making an active selection among the identified touches. Step 902 also involves determining touch data for the output set. Similarly to step 901, the step of actively favoring in step 902 may operate on data retrieved from the priority area definition by step 901'.

It should be understood that there is a complete analogy between the temporal prioritization and the spatial prioritization, and thus the above-described examples of temporal prioritization in relation to steps 202-208 are equally applicable to spatial prioritization.

The touch data extraction process of FIG. 9(a) is typically executed by a data processing device (cf. decoding unit 6 in FIG. 1) which is connected to acquire the sensor signal of the sensors 2 in the touch system. FIG. 9(b) shows an example of such a data processing device 6 for executing the process in FIG. 9(a). In the illustrated example, the device 6 includes an input 90 for receiving the sensor signal. The device 6 further includes a data acquisition element (or means) 91 for obtaining the sensor signal via the input 90, a touch identification element (or means) 92 for processing the sensor signal to identify touches, a determination element (or means) 93 for determining the output set and generating the touch data for the output set, and an element 94 for outputting the touch data via an output 95.

One benefit of spatial prioritization is that a new touch that falls within the priority area may be detected even though there are several touches already present elsewhere on the touch surface. For example, consider the gaming table 1000 shown in FIG. 10, in which the touch surface 1 is combined with a display screen that is controlled (e.g. by an application unit 7, cf. FIG. 1) to display a graphical user interface (GUI) of a gaming application. The GUI defines different gaming areas, e.g. a croupier area 1001, a dealing area 1002 and player areas 1003. The spatial prioritization may be configured such that when the croupier puts down a finger within the croupier area 1001, touch data for the resulting touch is output irrespective of the number, strengths and temporal history of other touches on the touch surface 1.

Many variants are possible within the general concept of spatial prioritization. For example, the interaction outside the priority area may be ignored when there is a touch detected within the priority area. It is also possible to have a set of priority areas with different priority, given by the priority value, whereby priority areas are processed in order of priority or the identified touches are included in the output set by order of priority. Thus, if the output set is limited to a predefined maximum number of touches, it is ensured that at least touches from certain priority areas are included therein. It is also possible that a priority area is associated (via the priority area definition) with a restriction on the number of touches to be included in the output set, and that different priority areas have different restrictions on the number of touches. It is also possible that a priority area is associated with a persistence requirement, which specifies that the touch must be detected within a certain priority area for a given number of frames before it is included in the output set. Such a requirement may e.g. be given to an emergency shutdown button displayed on the touch screen, to avoid that the system is shutdown by mistake, while ensuring that the system indeed reacts to a conscious touch on the emergency shutdown button.

It is to be understood that the priority value, the number restriction, and any other parameter of a priority area may change as a function of time. It is also to be understood that the priority areas may be static (i.e. fixed in relation to the touch surface) or change shape and/or location for different applications or depending on what is displayed on the touch surface. The priority areas may alternatively be determined by the user, e.g. through touch gestures in previous frames.

All of the above-described methods, processes and steps may be implemented by a decoding unit 6, e.g. as shown in FIG. 1 and exemplified in FIGS. 3(b) and 9(b). All or part of the functionality of the decoding unit 6 may be provided by dedicated hardware and/or by special-purpose software (or firmware) run on one or more general-purpose or special-purpose computing devices. In this context, it is to be understood that each "element" or "means" of such a computing device refers to a conceptual equivalent of a method step; there is not always a one-to-one correspondence between elements/means and particular pieces of hardware or software routines. One piece of hardware sometimes comprises different means/elements. For example, a processing unit serves as one element/means when executing one instruction, but serves as another element/means when executing another instruction. In addition, one element/means may be implemented by one instruction in some cases, but by a plurality of instructions in some other cases. Such a software controlled computing device may include one or more processing units, e.g. a CPU ("Central Processing Unit"), a DSP ("Digital Signal Processor"), an ASIC ("Application-Specific Integrated Circuit"), discrete analog and/or digital components, or some other programmable logical device, such as an FPGA ("Field Programmable Gate Array"). The computing device may further include a system memory and a system bus that couples various system components including the system memory to the processing unit. The system bus may be any of several types of bus structures including a memory bus or memory controller, a peripheral bus, and a local bus using any of a variety of bus architectures. The system memory may include computer storage media in the form of volatile and/or non-volatile memory such as read only memory (ROM), random access memory (RAM) and flash memory. The special-purpose software may be stored in the system memory, or on other removable/non-removable volatile/non-volatile computer storage media which is included in or accessible to the computing device, such as magnetic media, optical media, flash memory cards, digital tape, solid state RAM, solid state ROM, etc. The computing device may include one or more communication interfaces, such as a serial interface, a parallel interface, a USB interface, a wireless interface, a network adapter, etc, as well as one or more data acquisition devices, such as an A/D converter. The special-purpose software may be provided to the computing device on any suitable computer-readable medium, including a record medium, a read-only memory, or an electrical carrier signal.

The invention has mainly been described above with reference to a few embodiments. However, as is readily appreciated by a person skilled in the art, other embodiments than the ones disclosed above are equally possible within the scope and spirit of the invention, which is defined and limited only by the appended patent claims.

For example, it is to be understood that the reference to maximum, minimum, raised value, lowered value, etc is given only for a specific implementation of signal values, parameter values, threshold values, etc, and is not to be construed as limiting. For example, a maximum is equivalent to a minimum given a different definition of the signal/parameter/threshold values.

Furthermore, it is of course possible to combine temporal and spatial prioritization. In one such example, which may e.g. be used when there is a maximum limit to the number of touches in the output set, different prioritization criteria are applied sequentially to actively decide on which touches are to be included in the output set within a detection frame, until the maximum limit is reached. In such an embodiment, a first criterion is applied to identify a first set of touches; and if the maximum limit is not reached, a second criterion is then applied to identify a second set of touches, etc. Such an embodiment need not combine spatial and temporal criteria, but may be based on different temporal criteria or different spatial criteria, optionally in combination with conventional criteria such as strength, area, shape of the touches.

The invention claimed is:

1. A method for extracting data from a multi-touch sensing apparatus, said method operating in a sequence of detection frames, at least one detection frame among the sequence of detection frames comprising:
   obtaining at least one signal representative of objects on a touch surface of the multi-touch sensing apparatus;
   processing said at least one signal to identify touches;
   determining a set of identified touches and touch data for the set of identified touches; and
   outputting the touch data;
   wherein each of the detection frames includes a spatial prioritization, the spatial prioritization based on a previous touch, which is identified by the processing performed in one or more preceding detection frames; and
   wherein the processing said at least one signal to identify touches includes
      comparing a spatial distribution of signal values of the at least one signal with corresponding threshold signal values, using the spatial prioritization to estimate a location of a touch corresponding to the previous touch, and
      locally changing the corresponding threshold signal values based on the estimated location.

2. The method of claim 1, wherein the processing operates to promote identification of the touch in said at least one signal.

3. The method of claim 1, wherein the processing further comprises:
identifying a signal feature in said at least one signal based on the estimated location of the touch.

4. The method of claim 3, wherein
the signal feature is a local change in signal values of a projection signal; and
the signal values correspond to transmitted energy on a plurality of detection lines across the touch surface.

5. The method of claim 3, wherein the signal feature corresponds to a local change in signal values in a distribution of an energy-related parameter within at least part of the touch surface.

6. The method of claim 1, wherein the signal values are included in said at least one signal.

7. The method of claim 1, wherein the signal values are included in a distribution of an energy-related parameter within at least part of the touch surface, said distribution being obtained based on said at least one signal.

8. The method of claim 1, wherein the processing further comprises:
obtaining, based on said at least one signal, a distribution of an energy-related parameter within at least part of the touch surface;
identifying a set of local extrema in the distribution;
sequentially processing the set of local extrema for determining the touch data; and
favoring one or more local extrema in the set of local extrema.

9. The method of claim 1, wherein
the processing further includes identifying a number of touches based on said at least one signal; and
the determining includes selecting the set of identified touches as a subset of said identified number of touches.

10. The method of claim 9, wherein the set of identified touches is limited to a predefined maximum number of touches.

11. The method claim 9, wherein the processing further comprises:
determining age data for each of the identified touches, the age data representing a number of preceding detection frames in which a touch is deemed to be identified; and
wherein said set of identified touches is selected among the identified number of touches based on the age data.

12. The method of claim 1, further comprising:
sequentially applying different prioritization criteria to determine the set of identified touches.

13. The method of claim 1, further comprising:
accessing a history list including location data and age data of touch traces, wherein
each of the touch traces represents a corresponding previous touch,
the location data for a touch trace among the touch traces represents a most recent location of the corresponding previous touch on the touch surface, and
the age data for the touch trace among the touch traces represents the number of detection frames in which the corresponding previous touch has been identified; and wherein
the determining determines the set of identified touches based on at least the location data in the history list.

14. The method of claim 13, further comprising:
matching said set of identified touches for a current detection frame to the touch traces in the history list; and
updating the history list based on the matching.

15. A non-transitory computer-readable storage medium comprising computer code which, when executed on a data-processing system, causes the data-processing system to carry out the method of claim 1.

16. The method of claim 1, wherein the spatial prioritization for a detection frame, in the sequence of detection frames, provides spatial information regarding peaks having been identified as touches in one or more previous detection frames in the sequence of detection frames.

17. A device for generating touch data, said device configured to operate in a sequence of detection frames, and said device comprising:
an input; and
one or more processors connected to said input, the one or more processors configured to execute computer-readable instructions such that the one or more processors are configured to in at least one detection frame
obtain, via said input, at least one signal representative of objects on a touch surface of a multi-touch sensing apparatus;
process said at least one signal to identify touches;
determine a set of identified touches and touch data for the set of identified touches; and
output said touch data;
wherein each of the detection frames includes a spatial prioritization, the spatial prioritization based on a previous touch, which is identified by the processing performed in one or more preceding detection frames; and
wherein the one or more processors are configured to execute the computer-readable instructions such that the one or more processors are further configured to process said at least one signal to identify the touches by
comparing a spatial distribution of signal values of the at least one signal with corresponding threshold signal values,
using the spatial prioritization to estimate a location of a touch corresponding to the previous touch, and
locally changing the corresponding threshold signal values based on the estimated location.

18. A multi-touch sensing apparatus, comprising:
a touch surface, a plurality of sensors arranged within and/or around the touch surface and adapted to generate at least one signal representative of objects on the touch surface, and the device of claim 17.

19. The device of claim 17, wherein the spatial prioritization for a detection frame, in the sequence of detection frames, provides spatial information regarding peaks having been identified as touches in one or more previous detection frames in the sequence of detection frames.

* * * * *